(12) United States Patent
Miller et al.

(10) Patent No.: US 11,576,105 B2
(45) Date of Patent: Feb. 7, 2023

(54) NETWORK MESSAGE TRANSMISSIONS REDUCTION SYSTEMS AND METHODS

(71) Applicant: AVI-On Labs, LLC, Park City, UT (US)

(72) Inventors: Eric Miller, Park City, UT (US); James Hawkins, Sandy, UT (US); Sebastian R. Borda, Cuidad de Buenos Aires (AR); Federico Pfaffendorf, Cuidad de Buenos Aires (AR); Keenan McCall, Park City, UT (US)

(73) Assignee: AVI-On Labs, LLC, Park City, UT (US)

(*) Notice: Subject to any disclaimer, the term of this patent is extended or adjusted under 35 U.S.C. 154(b) by 116 days.

(21) Appl. No.: 17/234,094

(22) Filed: Apr. 19, 2021

(65) Prior Publication Data
US 2021/0243673 A1     Aug. 5, 2021

Related U.S. Application Data

(62) Division of application No. 16/774,834, filed on Jan. 28, 2020, now Pat. No. 10,986,559.

(51) Int. Cl.
*H04W 40/24* (2009.01)
*H04W 4/80* (2018.01)
(Continued)

(52) U.S. Cl.
CPC .......... *H04W 40/246* (2013.01); *G06F 3/011* (2013.01); *H04L 1/1816* (2013.01); *H04L 41/12* (2013.01);
(Continued)

(58) Field of Classification Search
CPC ...... G06F 3/011; H04L 1/1816; H04L 1/1887; H04L 1/1896; H04L 41/12; H04L 47/28; H04L 47/283; H04L 47/286; H04L 47/32; H04L 63/0876; H04L 63/108; H04W 12/08; H04W 4/70; H04W 4/80; H04W 40/246; H04W 8/005
(Continued)

(56) References Cited

U.S. PATENT DOCUMENTS

2014/0254372 A1* 9/2014 Fisher ................. H04L 41/0806
370/235
2019/0373063 A1* 12/2019 Kowalewski ........... H04L 67/56
(Continued)

*Primary Examiner* — Tan H Trinh
(74) *Attorney, Agent, or Firm* — Kramer Levin Naftalis & Frankel LLP

(57) ABSTRACT

Systems and methods for reducing the amount of messages transmitted in large-scale distributed mesh networks are disclosed. Network components include transceivers and memory storing instructions which, when executed by a processing unit, reduce transmissions made by the transceiver within the network. The instructions executed by processing unit could (1) create an expiration parameter to limit the number of times a signal is retransmitted, (2) form groups of network components from which one or a few of the group network components are designated to respond on behalf of the group, (3) keep advertising transmissions dormant by default until called upon, (4) employ a time delay parameter for a time interval in which no transmission may be made, and (5) include message IDs in control signals that are transmitted.

20 Claims, 10 Drawing Sheets

(51) Int. Cl.
*H04W 8/00* (2009.01)
*H04L 29/06* (2006.01)
*H04L 1/18* (2006.01)
*H04L 12/24* (2006.01)
*H04L 12/823* (2013.01)
*H04L 9/40* (2022.01)
*G06F 3/01* (2006.01)
*H04L 41/12* (2022.01)
*H04L 47/32* (2022.01)

(52) U.S. Cl.
CPC .......... *H04L 47/32* (2013.01); *H04L 63/0876* (2013.01); *H04W 4/80* (2018.02); *H04W 8/005* (2013.01)

(58) Field of Classification Search
USPC ........................................ 370/235
See application file for complete search history.

(56) References Cited

U.S. PATENT DOCUMENTS

| | | | |
|---|---|---|---|
| 2020/0127930 A1* | 4/2020 | Kowalewski | H04L 47/34 |
| 2020/0204291 A1* | 6/2020 | Awoniyi-Oteri | H04W 76/28 |
| 2020/0348662 A1* | 11/2020 | Cella | G06N 3/088 |

* cited by examiner

NETWORK MESSAGE TRANSMISSIONS REDUCTION SYSTEMS AND METHODS

BACKGROUND

In structures such as houses and high-rise buildings, there may be many components such as switches and sensors through which target devices such as fixtures and appliances are powered to turn such target devices on/off through adaptors communicatively coupled to the target devices. These components may be grouped together to form one or more networks. When transceivers and processors are employed in some of these network components, a communication network employing a short-range communications protocol may be formed in which the target devices may be turned on/off via the adaptors. Other network components such as initialization/control (I/C) device and/or bridge devices may be included in the communications network through which a user may remotely operate and/or control the operations of the network. Examples of such communication networks were disclosed in the following publications: U.S. Pat. No. 9,781,245 entitled "Networking Systems, Protocols, and Methods for Controlling Target Devices" and issued to Miller on Oct. 3, 2017; and U.S. Pat. No. 10,237,391 entitled "Networking Systems, Protocols, and Methods for Controlling Target Devices" and issued to Miller on Mar. 19, 2019, each of which is incorporated herein in its entirety.

In mesh communications networks like those disclosed in Miller, each network component may be assigned a unique network address defined by parameters stored in memory for the network component. These parameters may include a location ID identifying the network and a unique device ID for identifying the network component. Where the network component is a controller (e.g., a switch or sensor) for controlling one or more controlled devices, the controller may be assigned a target ID parameter that defines those network components that the controller is programmed to control. For example, the controller may store a target device ID or group ID stored in memory to indicate the controller's role of controlling either one controlled device or a group of controlled devices, respectively.

Network components are typically manufactured in a state with no stored network ID. In order to join a network, the device advertises that it is available for connection and is added to a network via standard messages that can be read without requiring encryption keys. Upon selecting a device to add to a specific network, the device is provided a security key, network ID, and other relevant parameters by the programming device. Thereafter the device no longer advertises its availability for connection and will only operate within the specific network. This approach has the advantage of allowing any person with a programming device to add the device to a network, but it also opens a security vulnerability that may allow non-authorized users to add their own security ID and limits the functionality that can be applied to the device because many features are disabled prior to a device having a valid security key. These factors constrain the applicability of programming and diagnostic tools, especially those operating remotely, because (for security reasons) most features of the target device are disabled for remote access until a network ID is present.

Adaptors are network components configured to receive control signals and implement those control signals on one or more communicatively coupled target devices. A user can add an adaptor to the communications network by programming these adaptors (e.g. using an I/C device) with a location ID, a unique device ID, and/or a group ID. When an adaptor receives a control signal containing a target ID that matches its location ID and the device ID or group ID, the adaptor can implement the control signal on the target device(s) coupled thereto. Control signals destined for the device ID or group ID of the adaptor are received and implemented on the communicatively coupled target device(s).

The scalability of a distributed communications network is dependent on a number of factors, including the size and volume of messages exchanged over the network. The number of messages exchanged over the network may depend, in turn, on the number of times each message is relayed between nodes, and the number of "background" or "overhead" messages used to connect nodes and otherwise maintain the network. For example, when a room is occupied, motion sensors in the room may generate large numbers of motion trigger events. If all motion trigger events are sent to every other network component in the distributed communications network the network can quickly become congested with unnecessary network traffic. Additionally, when operating a mesh communications network using BLUETOOTH® devices, each radio constantly advertises, thereby generating considerable background traffic that can limit the bandwidth available for necessary messages.

Additionally, it is often difficult to determine the status of controlled devices in a mesh communications network because each device must be polled individually. When hundreds or thousands of nodes are present, this task can be very time consuming. The network traffic created by requesting the statutes of many nodes at once can render the network unavailable for other tasks, such as turning on a light using a motion sensor or switch configured to communicate with the network.

These factors limit the scalability of the mesh communications network because individual network nodes have limited processing speed and memory for handling messages. Too many messages can overflow the nodes' memory buffers, potentially leading to control signals arriving at the destination out of order or not being received at the destination at all. Thus, when networks of hundreds or thousands of nodes are deployed in a single area such as a building or home, desired messages may not pass quickly and successfully through the network.

SUMMARY

Embodiments of the inventive concepts disclosed herein are directed to systems, protocols, and methods for reducing the amount of messages transmitted in large-scale distributed mesh networks employing short-range communications protocol(s). The systems and methods could be employed individually or collectively to reduce the burden of excessive message transmissions. As a result, messages may be rapidly and reliably sent and received, influence caused by nearby radios employing protocols such as BLUETOOTH®, Wi-Fi®, and Zigbee® may be reduced, and impact to these nearby radios employing such protocols may be limited.

Generally speaking, systems and methods are disclosed for improving the scalability of a distributed communications network by reducing the number of message transmissions required to successfully operate the distributed communications network. For purposes of this disclosure, network components in a distributed communications network (also referred to as "nodes") may be conceptualized as "source nodes" that generate particular control signals, "intermediate nodes" that retransmit, or "forward," received control signals, and "destination nodes" that implement received control signals. In the event that a destination node is part of a group, the destination node may also act as an intermediate node, forwarding received control signals to ensure that those signals reach each member of the group.

In some embodiments, systems and methods are provided for improving the scalability of a distributed communications network by utilizing messages that include an expiration parameter. In these embodiments, a node receiving the message determines whether the message is eligible for retransmission. If the message is eligible for retransmission, the node can adjust the expiration parameter within the control signal and forward the control signal with the adjusted expiration parameter. Designating an expiration parameter for a message sent over a distributed communications network can help strike a balance between allowing messages to be retransmitted through the network by other nodes enough times that the message reliably reaches its destination while also reducing unnecessary retransmissions to prevent overloading the network's capacity.

In some embodiments, systems and methods are provided for improving the scalability of a distributed communications network by grouping together one or more network components to form a responder group of network components. A transceiver found in network component could include a group responder parameter indicative of whether a particular network, the "group responder," component will respond on behalf of the other group components. Thus, when a network component receives a message requesting a response from a group of network components, it will determine whether it has been designated as a group responder for the group and, if so, transmit the response message. Reducing the number of network components asked to respond to a status request can greatly reduce the volume of network traffic that would otherwise be generated.

In some embodiments, systems and methods are provided for improving the scalability of a distributed communications network by reducing unnecessary network traffic in the form of advertising messages. In these embodiments, advertising messages may be turned off by default. When another network component, such as an Initialization/Control ("I/C") device wishes to establish a direct connection to an adaptor or controller, it sends an "activate" command to nearby network components, asking those network components to begin advertising (e.g, for a specified period of time). This technique permits connections between nearby devices without requiring each network component in the distributed communications network to advertise its presence at all times.

In some embodiments, systems and methods are provided for improving the scalability of a distributed communications network by preventing source nodes from initiating two instances of the same message within a specified time period. For example, a motion sensor may be prevented from initiating two control signals for turning on a group of lights within a specified period of time. For example, lights controlled by a motion sensor are typically programmed to turn off after a specified period of time after not having received an indication from the motion sensor that the room remains occupied. The motion sensor may be prevented from sending new control signals until shortly before the lights are programmed to turn off.

In some embodiments, systems and methods are provided for improving the scalability of a distributed communications network by preventing a network component from forwarding a message that it forwarded once before. In these embodiments, a source node may generate a message that includes a unique message ID parameter. When an intermediate or destination node receives the message, it can determine whether the message is eligible for retransmission by cross-referencing the message ID in the received message against the message IDs of message it has already received and forwarded. If the message ID is on the list of already forwarded messages, the node will not forward the message. If the message ID is not on the list, however, the node can forward the message and add the message ID parameter to the list of already forwarded messages. This concept is distinguished from Time to Live (TTL) which increments a message count whether or not the specific device in question has seen the message before.

In some embodiments, network components may be shipped to the network location with a generic network ID and security key already stored in memory, thereby unlocking increased functionality such as remote access and encrypted communications, for example. The generic network ID may be kept confidential by the manufacturer and may be used to initially install and initialize a new mesh communications network by an authorized user who has been given access to the generic network ID and security key. Because the network components arrive at the installation site already programmed with a generic network ID and/or security key, general advertising can be disabled, and access by unauthorized third parties who do not have access to the generic network ID and security key is restricted. Once the new mesh network is established, each network component may be re-programmed with a network-specific network ID and/or security key.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

In the following description, several specific details are presented to provide a thorough understanding of embodiments of the inventive concepts disclosed herein. One skilled in the relevant art will recognize, however, that embodiments of the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Some advantages and benefits of the inventive concepts disclosed herein are shown in FIGS. 1A through 8, illustrating how the communication network 100 may reduce the number of transmissions performed by network components, each of which is configured with a transceiver for receiving and forwarding messages via a short-range communications protocol until such messages reach their intended destination(s). As used herein, the term "message" refers to any message transmitted from one node to another over the short-range communications protocol employed by the distributed communications network. The term "control signal" refers to any message that includes a target ID and a control command for the destination node(s) associated with the target ID to implement. The term "target ID" refers to a "device ID" or a "group ID."

Figure 1A:
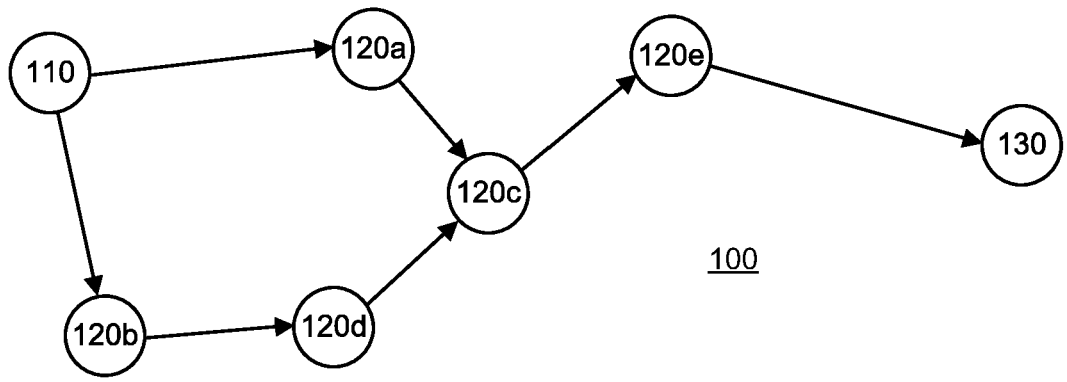
FIGS. 1A-1K illustrate an exemplary distributed communications network that may reduce the number of transmissions performed by network components configured with a transceiver for receiving and forwarding signals, in accordance with some embodiments.

Referring now to FIG. 1A, communications network 100 is configured as a basic distributed mesh network suitable for implementation of the inventive concepts described herein. Communications network 100 includes a plurality of network components programmed with a common network ID, including source node 110, intermediate nodes 120, and destination node(s) 130. These nodes are peers in a distributed communications network and communicate with one another via transceivers enabled for sending messages using short-range communications protocols.

Prior to installation and/or initialization, each network component may be pre-programmed with a generic network ID. The generic network ID is a value stored in the network component's memory (e.g. in a network ID field) that does not represent any specific, established mesh communications network. For example, the device manufacturer may pre-program each network component with a generic network ID before selling providing the network component to an installer or consumer. Knowledge of generic network ID is preferably retained by the manufacturer or otherwise made known only to those involved in installing and initializing a new mesh communications network, thereby limiting access to non-authorized users. Each network component may also be pre-programmed with a security key used for encrypted communications between network components.

Because each network component ships having been pre-programmed with a generic network ID and/or security key, general advertising can be disabled, improving security by minimizing access to non-authorized users who do not possess the generic network ID and/or the security key. Additionally, pre-programming network components in this way beneficially safely permits increasing the range of commissioning and diagnostic functionalities available to network components before they are explicitly added to a network. Once a system has been installed and commissioned, the general encryption key can be replaced by a building specific key, thereby securing the network to a specific account and removing the risk that a specific network could be accessed if the generic key is compromised. This is particularly effective because the time from when a device is first installed in a location and when the system is fully commissioned and transitioned to a building specific key is quite short, from less than a day to a few weeks at most. In some embodiments, the generic key can be changed periodically, limiting the risk that a compromised key could be used widely. Further, the network key update can be accomplished using the full encrypted security of the network, allowing the key update to be performed remotely.

Once encrypted with a network-specific network ID and/or security key, network components are no longer accessible with the generic key, and the security key can only be applied if the current building key is held. Full power reset of the device (which can only be performed locally via a button push, power cycle sequence, or other local means) will restore the device to a raw state with no security key, so the general network key cannot be read from device memory once it has been assigned a specific building key.

Source node 110 may represent any network component capable of generating a control signal and transmitting that signal over the distributed communications network. The control signal may be generated in response to a user input (e.g., a user flipping a switch or interacting with a user interface of an I/C device), an environmental input (e.g., physical motion captured by a motion sensor), a pre-programmed command (e.g., a command for turning particular lights on or off at a scheduled time), or a command received at a remote access bridge from a device located outside of the distributed communications network. Thus, for example, source node 100 may represent an initialization/control ("I/C") device, remote access bridge ("bridge"), or any other controller, such as a switch or sensor. The designation of a node as a source node simply means that that node was the node responsible for generating a particular message.

In some embodiments, systems and methods are provided for improving the scalability of a distributed communications network by utilizing a bridge device asymmetrically such that inbound and outbound messages are handled differently. For inbound messages received at a bridge device from outside the distributed communications network, the bridge device generates and transmits messages just like any other source node of the network. The bridge device, being a peer node, can also act as an intermediate node, forwarding messages throughout the network as appropriate.

For outgoing messages destined for a location outside the distributed communications network, however, the bridge device may be configured to receive and process many messages from a large number of network components at once. For example, the bridge device may be provided with a larger antenna than those used by other network components within the distributed communications network such that it receives messages from more distant network components than other nodes of the network. This technique permits messages destined for a location outside of the distributed communications network to be sent with a relatively aggressive expiration parameter, thereby limiting the traffic required to send these messages out of the network.

In some embodiments, a bridge device for handling outgoing messages may be the same bridge device that handling incoming messages. In other embodiments, however, a distributed communications network can include more than one bridge device, with the bridge device that handles outgoing messages being configured with a more powerful antenna and processor for receiving and processing messages than the bridge device that handles incoming messages. In a further embodiment, the two types of bridges may be contained within a single form factor where each bridge is assigned its own device ID when initialized.

In order for the outgoing bridge to process messages from a multiplicity of network nodes simultaneously (as opposed to handling messages one at a time) the outgoing bridge can employ post-collection data-processing techniques in order to eliminate duplicate message, decrypt messages as necessary, and then forward the message(s) out of the network (e.g., to a cloud server or other remote data collection system).

Destination node(s) 130 may represent any network component(s) capable of receiving a control signal over the distributed communications network and implementing that signal. Thus, for example, destination node 130 may represent an adaptor that is coupled to a target device. The designation of a node as a destination node simply means that that node was the target of a particular control signal.

Intermediate nodes 120 may represent any network components that receive a message over the distributed communications network and forward the message without implementing a control signal. Because all network components in the distributed communications network are peers, all nodes other than source node 110 and destination node(s) 130 are potential intermediate nodes.

Figure 1B:
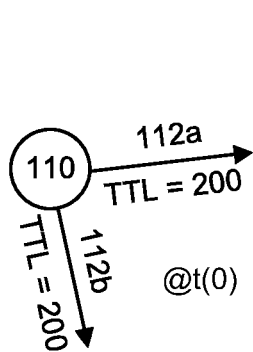

Referring now to FIG. 1B, assume that source node 110 has transmitted a control signal 112 (divided into signals 112a through 112i to illustrate that the same signal may be received by more than one other node) to other nodes of the communication network 100 at time t(0). The control signal may include a location ID (identifying the network), a target ID for the destination node(s), and a command to be performed by the destination node upon being received.

Control signal 112 may include an expiration parameter (e.g., a time-to-live ("TTL") parameter) that limits the number of times the control signal may be forwarded before being allowed to expire. For the purpose of illustration and not of limitation, the TTL at the source node 110 is assumed to have a measurement value equal to 200. In some embodiments, a unit of the measurement could be expressed as number of retransmissions as shown in this example. In some embodiments, a unit of the measurement could be expressed in time.

A suitable TTL value for a particular message may depend on a number of factors, including the number of network components in communications network 100 and whether control signal 112 is being issued from a stationary source node, such as a switch or motion sensor, or a roaming source node, such as mobile phone acting as an I/C device. For example, in a large distributed communications network containing thousands of network components, a relatively large TTL parameter may be required to ensure that the control signal reaches the destination nodes. Additionally, if control signal 112 is transmitted from a stationary source node, it may be appropriate to set the TTL parameter to a relatively small number (e.g., 5) on the assumption that the stationary source node will only be responsible for controlling devices in the immediate vicinity. The TTL value is preferably set at the time the network component is initialized. However, in some embodiments a user initiating a control signal may choose a particular TTL value at the time the message is sent. Further a user utilizing an I/C device may alter the TTL value for messages originating from any network component in communications network 100 at any time (e.g., when network components are added or removed from communications network 100, when it is determined that messages originating from a particular source node do not reliability reach one or more destination nodes, or when it is determined that messages originating from a particular source node can reliably reach the destination node(s) with a more aggressive TTL value).

Figure 1C:
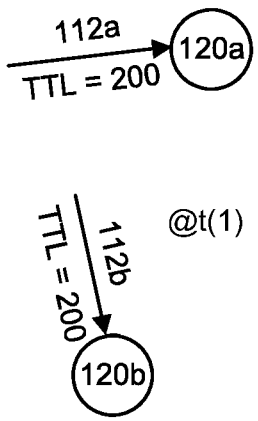
Figure 1D:
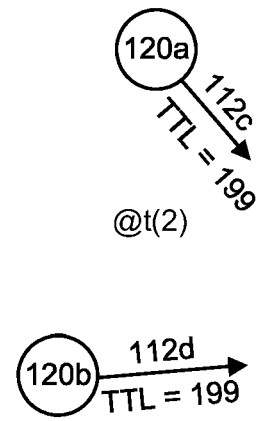

Referring now to FIGS. 1C and 1D, assume that the intermediate nodes 120a and 120b receive signals 112a and 112b at time t(1), determine that their device IDs and group IDs do not match the target ID specified in the control signal, and retransmit each as signals 112c and 112d at time t(2) as shown. Intermediate nodes 120a and 120b each decrement the TTL parameter by one to 199 before the retransmission. It should be noted that, although this example the use of the TTL parameter as a decreasing parameter, the embodiments discussed herein are not limited to such operation of the TTL parameter; rather, in some embodiments, an operation performed on the TTL parameter could include any operation which enables a monitoring of retransmissions of the control signal 112 before expiring.

Figure 1E:
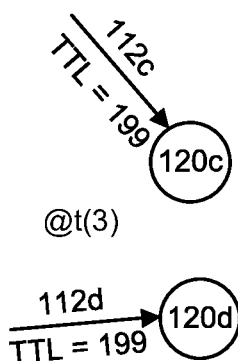
Figure 1F:
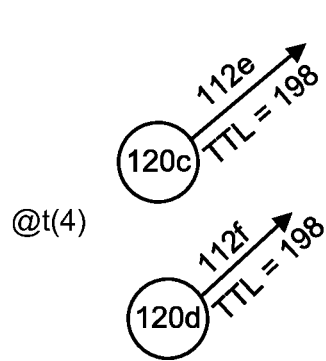

Referring now to FIGS. 1E and 1F, assume that intermediate nodes 120c and 120d receive signals 112c and 112d at time t(3), determine that their device IDs and group IDs do not match the target ID specified in the control signal, and retransmit each as signals 112e and 112f at t(4) as shown. As observed, intermediate nodes 120c and 120d each decrement the TTL parameter by one to 198 before retransmission.

Figure 1G:
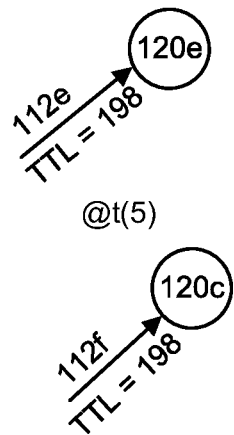
Figure 1H:
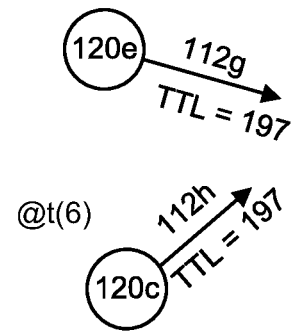
Figure 1I:
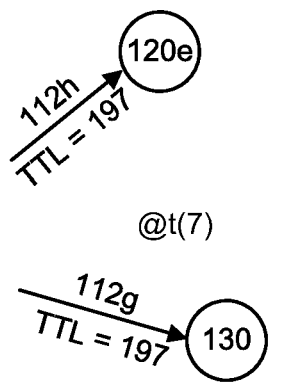

Referring now to FIGS. 1G and 1I1, assume that intermediate nodes 120e and 120c receive signals 112e and 112f at time t(5), determine that their device IDs and group IDs do not match the target ID specified in the control signal, and retransmit each as signals 112g and 112h at time (6) as shown. As observed, the intermediate nodes 120e and 120c each decrement the TTL parameter by one to 197 before retransmission.

Figure 1J:
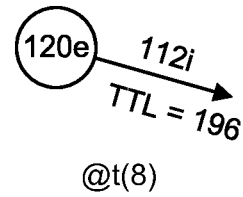

Referring now to FIGS. 1I and 1J, assume that destination node 130 and intermediate node 120e receive signals 112g and 112h at time t(7) as shown, and intermediate node 120e retransmits each as signal 112i at time t(8) as shown. As observed, intermediate node 120e determines that its device ID and group ID do not match the target ID specified in the control signal, and decrements the TTL parameter by one to 196 before the retransmission.

Because signal 112g has reached the destination node 130, destination node 130 could be instructed not to retransmit this signal. For example, if control signal 112g specified destination node 130's device ID in the target ID field, destination node 130 can determine that no other network component in communications network 100 needs to receive the signal and determine that further retransmission would be unnecessary. However, if control signal 112g specified destination node 130's group ID, destination node 130 may determine that there could be other network components in communications network 100 still waiting to receive the signal. In that case, destination node 130 can implement the control command and then decrement the TTL parameter and retransmit the message just like any other intermediate node.

Figure 1K:
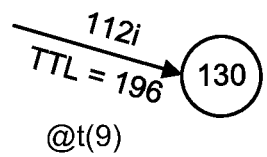

Referring now to FIG. 1K, assume that the destination node 130 receives control signal 112i at time t(9). Upon receiving signal 112i, destination node 130 could be instructed to not retransmit this signal. For example, as described below with respect to FIG. 8, destination node 130 may determine that it has already received and retransmitted and/or implemented control signal 112i and that it should not attempt to re-implement the command contained within the signal or retransmit the control signal to other network components within communications network 100.

Figure 2:
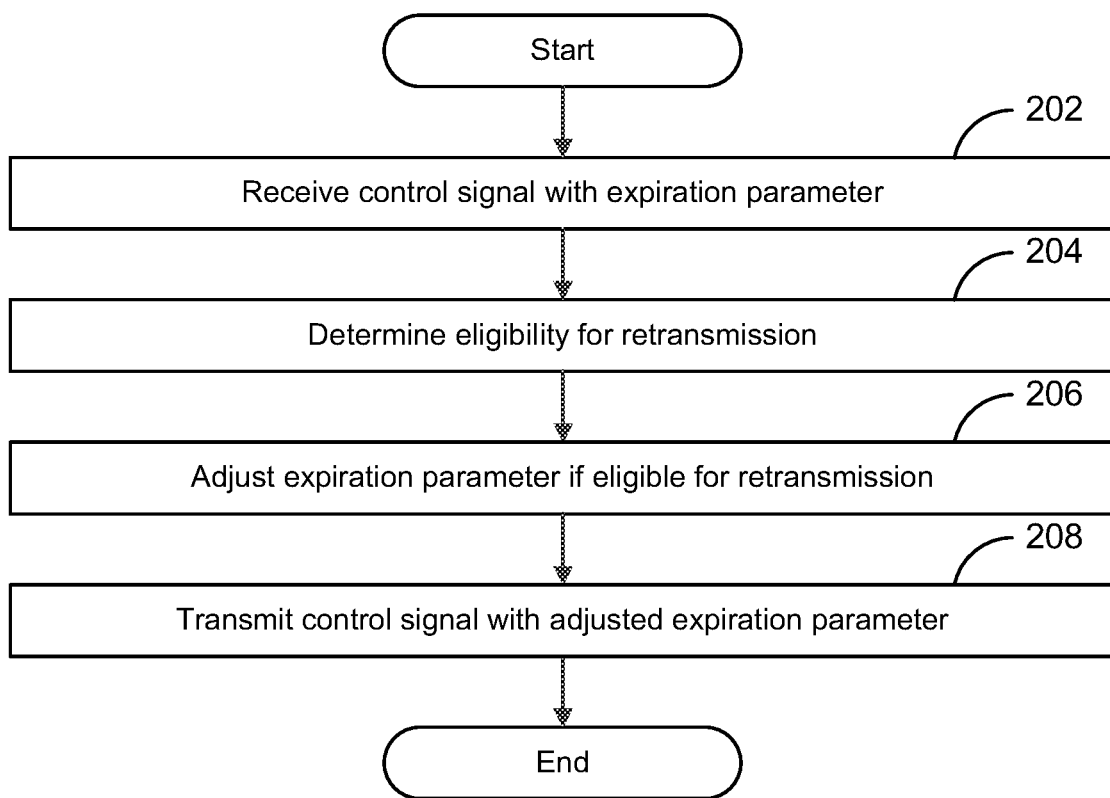
FIG. 2 is a flowchart of an exemplary method for reducing the number of message transmissions in the distributed mesh network of FIGS. 1A-1G, in accordance with some embodiments.

Referring now to FIG. 2, flowchart illustrating an exemplary method 200 for reducing the number of transmissions performed by the network components of the communications network 100. Each network component may include a processor programmed or otherwise configured to execute instructions to perform the method of method 200. For each network component, the instructions may be stored in memory communicating with the processor and can include code that determines whether to send, implement, and/or forward a control signal based on the network component's location ID and device ID or group ID, as well as the value of an expiration parameter (e.g., a TTL value located in the control signal).

An initial value for the TTL parameter, or other expiration parameter, may be set depending on a number of different factors with the goal being to reduce the number of messages required to ensure successful delivery of the message to the destination node(s). One factor used to determine a suitable TTL value for a particular message may be the total number of network components in the distributed communications network. For example, the in a distributed communications network having more than one-thousand network components, the TTL parameter might be set to a range of 100 to 200 to ensure successful operation. Another factor affecting the necessary TTL value for successful operation is the physical density of network components in the network. Where the network components are confined to a relatively small physical area, the TTL parameter may be set to relatively aggressive value in view of the fact that each message transmission will reach a relatively large number of network components. On the other hand, as the physical footprint of the distributed communications network increases, the TTL parameter may need to be set to a higher value to ensure successful operation. In some embodiments, each potential source node may be programmed to generate messages having a unique TTL value that suitably matches the node's role in the distributed communications network. For example, an immobile switch that is configured only to control target devices within a limited physical space (e.g., a single room) may be configured to generate messages having a very aggressive TTL value (e.g., a value in the range between 1 and 5) whereas an VC device that can move throughout the network, and other "master controllers" that are capable of controlling each device within the network, might be configured to generate messages having a higher TTL value (e.g., a value in the range between 10 and 20).

At step 202, one or more network components of communications network 100 receives a control signal transmitted from a source node that originated the control signal. In these embodiments, control signal include an expiration parameter, such as a TTL parameter, along with the location ID and device or group ID of the one or more destination nodes to which the control signal is addressed. In some embodiments, the control signal can also include a message ID that uniquely identifies the message.

At step 204, in response to receiving the control signal, each network component determines whether the control signal is eligible for retransmission. For example, each network component can determine whether the message has expired by comparing the expiration parameter to an expiration threshold. In the case that the expiration parameter is a TTL parameter, each network component receiving the message will forward the message so long as the TTL value is not set to 0. In some embodiments, each network component receiving the message also determines whether or not it already forwarded the message, (e.g., by cross-referencing the control signal's message ID against message IDs for recently forwarded messages) the node can refrain from forwarding the message again.

If the control signal is received at a destination node (i.e. a network component that matches either the device ID or group ID specified in the control signal), the destination node may or may not forward the control signal. For example, if the message specifies the node's device ID, the destination node may determine that it should not forward the message. However, if the message specifies a group ID, the destination node may determine that it should forward the message to ensure that the other nodes associated with the group ID receive the message.

At step 206, each network component that receives the control signal determines whether the TTL parameter has reached its expiration limit and, based on the determination, determines whether or not to forward the message. If a network component determines that it should forward a received message, it can adjust the TTL parameter accordingly and, at step 208, forward the message.

Figure 3A:
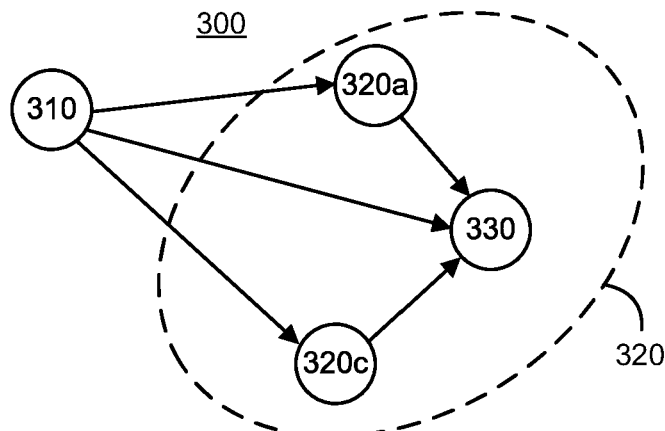
FIGS. 3A-3D illustrate another exemplary distributed communications network that may reduce the number of transmissions performed by network components configured with a transceiver for receiving and retransmitting signals, in accordance with some embodiments.

Referring now to FIG. 3A, a communication network 300 configured as a second basic distributed mesh network suitable for implementation of the inventive concepts described herein is presented. Communications network 300 includes a plurality of network components represented as a plurality of nodes 310 through 330, inclusive, in short-range communications with other nodes via the transceivers of the network components. Source node 310 could include any network component programmed with instructions for requesting the status of network components. Group 320 could be comprised of a plurality of group nodes 320a through 320c representative of a plurality of network components such as a plurality of controllers and/or a plurality of adaptors. Destination node 330 that could also be representative of a controller and/or an adaptor through which one or more controlled devices may be controlled. In some embodiments, although each of the network components in group 320 are assigned a unique device ID, each may share the same location ID and group ID.

In some embodiments, network components may be assigned a separate response group ID that identifies a group of network components independently from the "group ID" used to define a group of network components for the purposes of receiving and implementing control signals. For example, a response group ID may be assigned to a group of network components in close proximity to one another (as opposed to the group ID, which is used to control group behavior regardless of the network component's location within the network.

In some embodiments, response group IDs may be generated and updated dynamically. For example, each network component may dynamically determine those network components within one hop via the short-range communications protocol to create a network map. The network map may then be segmented into a number of response groups. Each response group may be assigned a single group responder. Preferably, the group responder is located one hop from each other network component in the responder group to reduce the number of messages required for each group responder to poll the network components in its response group.

In some embodiments, source node 310 initiates a general status request that does not identify any particular device ID or group ID. Then when a network component receives a status request, it can forward its status to its group responder, which then forwards information regarding the status of each node in its responder group. If the group responder does not receive a status update from one or more device in its response group within a predetermined period of time after receiving a first status update message, it may independently poll the network components in its responder group to determine the node's status.

In some embodiments, source node 310 initiates a status request specifically addressing each group responder. The set of all group responders in a communications network may be assigned a particular group ID, which the source node uses to poll those group responders. This group ID may be set, for example, upon initiation of a network mapping function. In various embodiments, the network mapping function may be initiated by a user (e.g. a person operating an PC device, on a pre-determined schedule. In some embodiments, the network mapping function may be initiated when a change to the network topology is detected. For example, if a group responder does not receive a response to a status check, it will not return a response for that node, and it may be determined that there has been a change to the network topology, initiating a new network mapping function. In some embodiments, the group responder's status check message may be set with a TTL of 1, so that it only responds with the status of those nodes within one hop.

In keeping within the spirit of the invention, the network may may be stored in a decentralized manner, with no single node storing the entire network map. In principle, each network component stores only one or more group responder IDs that indicate which of the one or more responder groups the node belongs to and a parameter that indicates whether the particular network component is a group responder for its responder group.

Figure 3B:
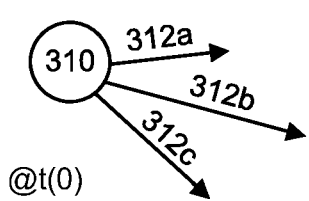

Referring now to FIG. 3B, assume that the source node 310 has transmitted a control signal 312 (divided into signals 312a through 312c) to other nodes of the communication network 300 at time t(0). The control signal may include the location ID and the group ID of the group 320 represented by group nodes 320a through 320c, and a request for status of the group nodes 320a through 320c.

Figure 3C:
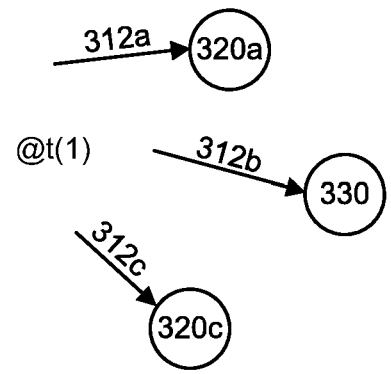

Referring now to FIG. 3C, assume that the group nodes 320a through 320c receive signals 312a through 312c at time t(1) as shown.

Figure 3D:
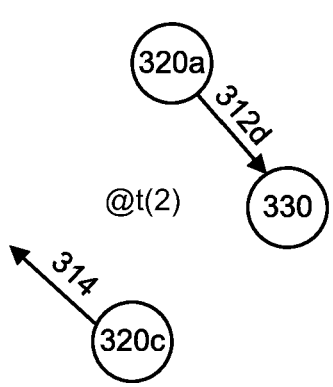

Referring now to FIG. 3D, group node 320a has retransmitted signal 312a as signal 312d at time t(2) but has not responded to the request. Also, for the sake of discussion, assume that group nodes 320c has been assigned or designated to be a group responder for the group 320. As illustrated, group responder node 320c has transmitted a signal 314 responding to the request at time t(2) while the others group nodes of the group 320 do not. In some embodiments, although only group node 320c has been assigned the role of group responder, more than one group node may be assigned the role.

Figure 4:
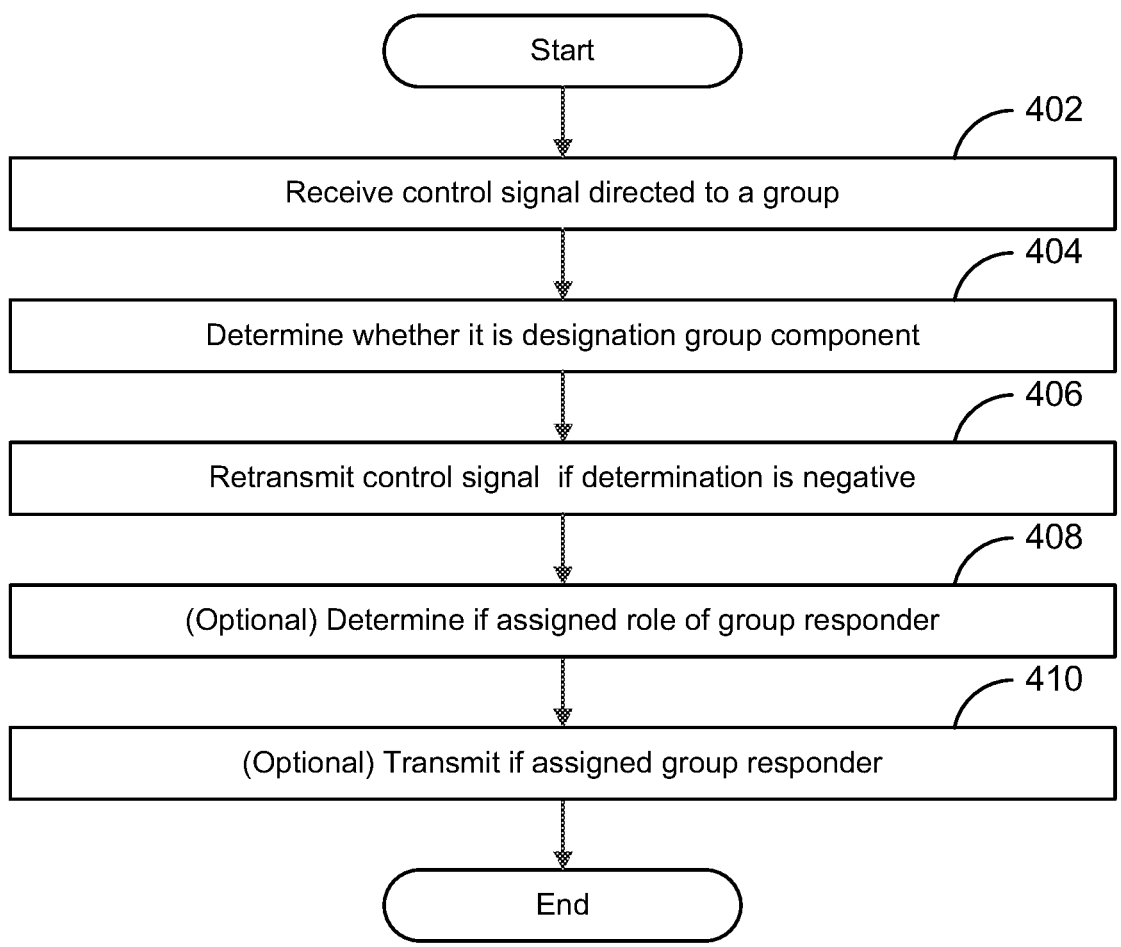
FIG. 4 is a flowchart of an exemplary method for reducing the number of message transmissions in the distributed mesh network of FIGS. 3A-3D, in accordance with some embodiments.

Referring now to FIG. 4, flowchart 400 is depicted disclosing an example of a second method for reducing the number of transmissions performed by the network components of the communication network 300, where each network component may include a processing unit programmed or configured to execute instructions to perform the method of the flowchart 400. For each network component, the instructions may be stored in memory communicating with the processing unit and include location ID, group ID, and designated responder ID parameters of the network component, where the latter parameter could an indicator (e.g., a flag that is set) used to indicate a network component that responds on behalf of a group of which it is part, where the number of such responding group components is less than the total number in the group. In some embodiments, there could be only one responding group component. In some embodiments, fewer than half of the group components could be responding group components.

The method of flowchart 400 begins with module 402 with one or more network components of the communication network 300 receiving a control signal transmitted from a source network component(s) from which the control signal originates. In some embodiments, the control signal could include location ID and group ID parameters of a defined group of network components to which the control signal is directed. In some embodiments, the control signal could include a request for information or feedback from the group of network components to which assigned group responder(s) may respond. In some embodiments, a destination group discussed herein could be a group of controller(s) and/or an adaptor(s) assigned or sharing the same location ID and group ID parameters.

The method of flowchart 400 continues with module 404 with each network component, in response to receiving the control signal, determining whether it is a destination group component that is part of the destination group from at least the location ID and group ID parameters.

The method of flowchart 400 continues with module 406 with an intermediate network component (i.e., a network component that is not a destination group component having the group ID parameter) may retransmit the control signal if the determination is negative, that is, the network component is not part of the destination group.

The method of flowchart 400 continues with module 408 with each destination group component, upon a positive determination, determining from its designated responder ID parameter whether it has been assigned the role of group responder or not.

The method of flowchart 400 continues with module 410 with each destination group component, upon determining that it has been assigned the role of group responder, transmitting a control signal on behalf of the group in response to the operation requested in the received control signal. Then, the method of flowchart 400 ends.

Figure 5A:
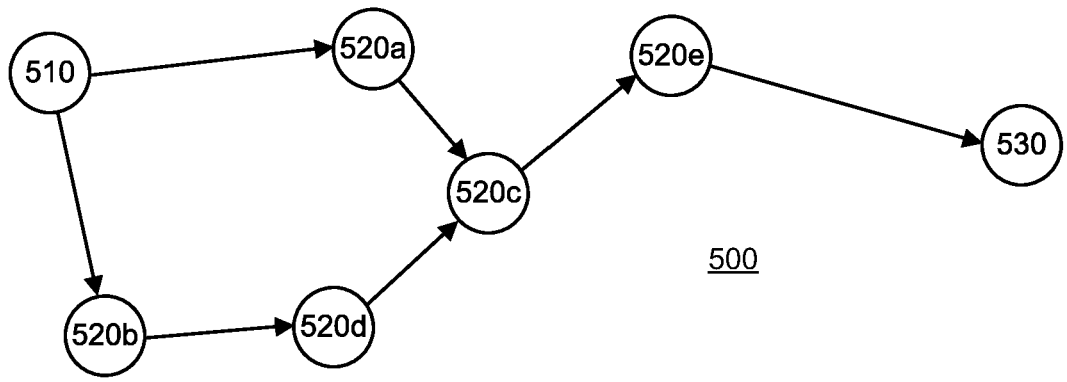
FIGS. 5A-5K illustrate another exemplary distributed mesh network that may reduce the number of transmissions performed by network components configured with a transceiver for receiving and retransmitting signals, in accordance with some embodiments.

Referring now to FIG. 5A, a communication network 500 configured as a third basic distributed mesh network suitable for implementation of the inventive concepts described herein is presented. Communication network 500 includes a plurality of network components represented as a plurality of nodes 510 through 530, inclusive, in short-range communications with other nodes via the transceivers of the network components. A source node 510 could be any network component programmed with instructions for requesting network components to activate a transmission channel advertising its presence to other network components. A plurality of intermediate nodes 520a through 520e, inclusive, could be representative of a plurality of controllers and/or a plurality of adaptors; and a destination node 530 that could also be representative of a controller and/or an adaptor through which one or more controlled devices may be controlled. In some embodiments, the second channel could be one employed by Bluetooth communication protocols. In some embodiments, the control signal could include a TTL parameter having a relatively small measurement value (e.g., TTL=10) to limit the number of retransmissions to limit the area in which the request to wake up is transmitted.

Figure 5B:
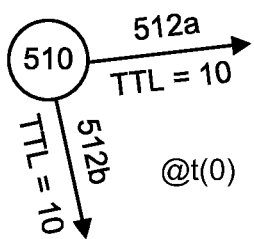

Referring now to FIG. 5B, assume that the source node 510 has transmitted a control signal 512 to other nodes of the communication network 500 at time t(0). In addition to a TTL parameter, the control signal may include an enable request parameter to request each network component receiving within the communications short-range to enable or activate their respective transmit mode by switching from its transmit-off (or receive-only) mode. In some embodiments, this mode could be the default mode.

Figure 5C:
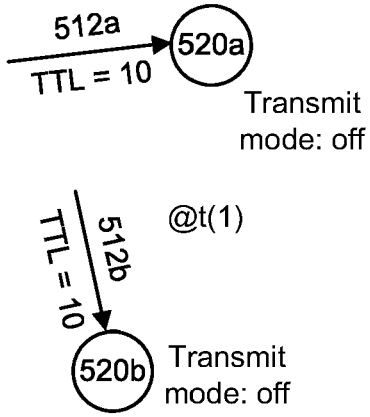
Figure 5D:
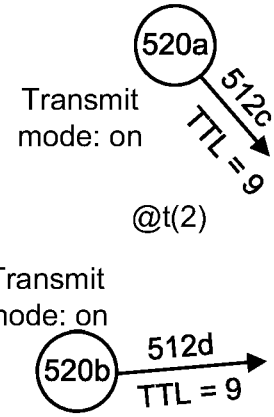

Referring now to FIGS. 5C and 5D, assume that the intermediate nodes 520a and 520b receive signals 512a and 512b at time t(1) and retransmit each as signals 512c and 512d at time t(2) as shown. As observed, the intermediate nodes 520a and 520b have been instructed by the enable request parameter to enable (i.e., turn on) their respective transmit modes so that they may repeatedly transmit their availability to the other nodes within the communications short-range the as well as decrement the TTL parameter by one to 9 before the retransmission.

Figure 5E:
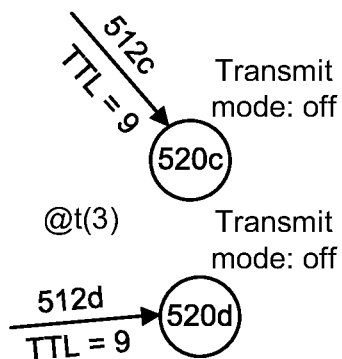
Figure 5F:
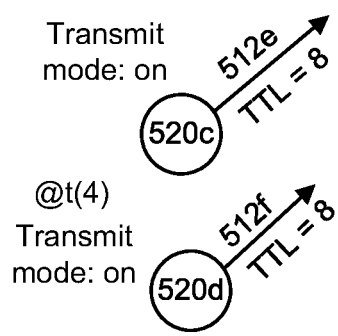

Referring now to FIGS. 5E and 5F, assume that the intermediate nodes 520c and 520d receive signals 512c and 512d at time t(3) and retransmit each as signals 512e and 512f at t(4) as shown. As observed, the intermediate nodes 520c and 520d have been instructed by the enable request parameter to enable their respective transmit modes so that they may repeatedly transmit their availability to the other nodes within the communications short-range the as well as decrement the TTL parameter by one to 8 before the retransmission.

Figure 5G:
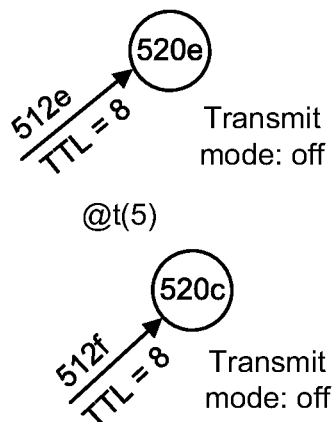
Figure 5H:
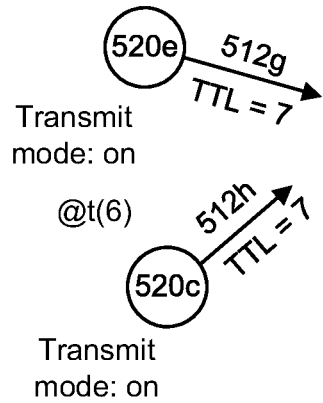

Referring now to FIGS. 5G and 5H, assume that the intermediate nodes 520e and 520c receive signals 512e and 512f at time t(5) and retransmit each as signals 512g and 512h at time (6) as shown. As observed, the intermediate nodes 520e and 520c have been instructed by the enable request parameter to enable their respective transmit modes so that they may repeatedly transmit their availability to the other nodes within the communications short-range the as well as decrement the TTL parameter by one to 7 before the retransmission.

Figure 5I:
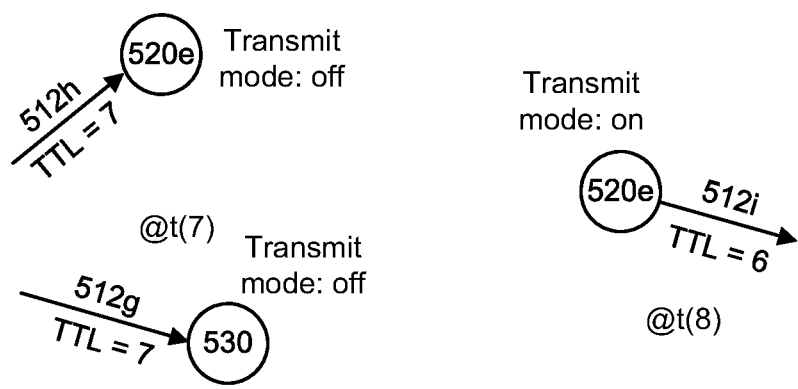
Figure 5J:
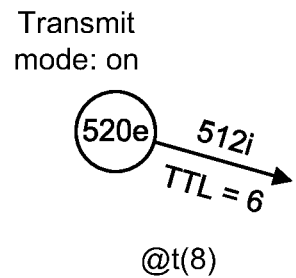

Referring now to FIGS. 5I and 5J, assume that the destination node 530 (as may be provided by location ID and device ID parameters in signal 512) and intermediate node 520e receive signals 512g and 512h at time t(7) as shown, and intermediate node 520e retransmits it as signal 512i at time t(8) as shown. As observed, the intermediate node 520e has been instructed by the enable request parameter to enable its respective transmit mode so that it may repeatedly transmit its availability to the other nodes within the communications short-range the as well as decrement the TTL parameter by one to 6 before the retransmission. Because signal 512g has reached the destination node 530, the destination node 530 could be instructed to ignore the enable request parameter.

Figure 5K:
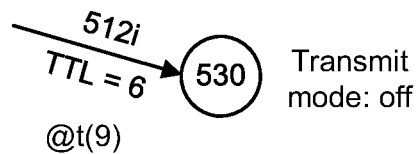

Referring now to FIG. 5K, assume that the destination node 530 receives signal 512i at time t(9). As discussed in the preceding paragraph, the destination node 530 could be instructed to ignore the enable request parameter.

Figure 6:
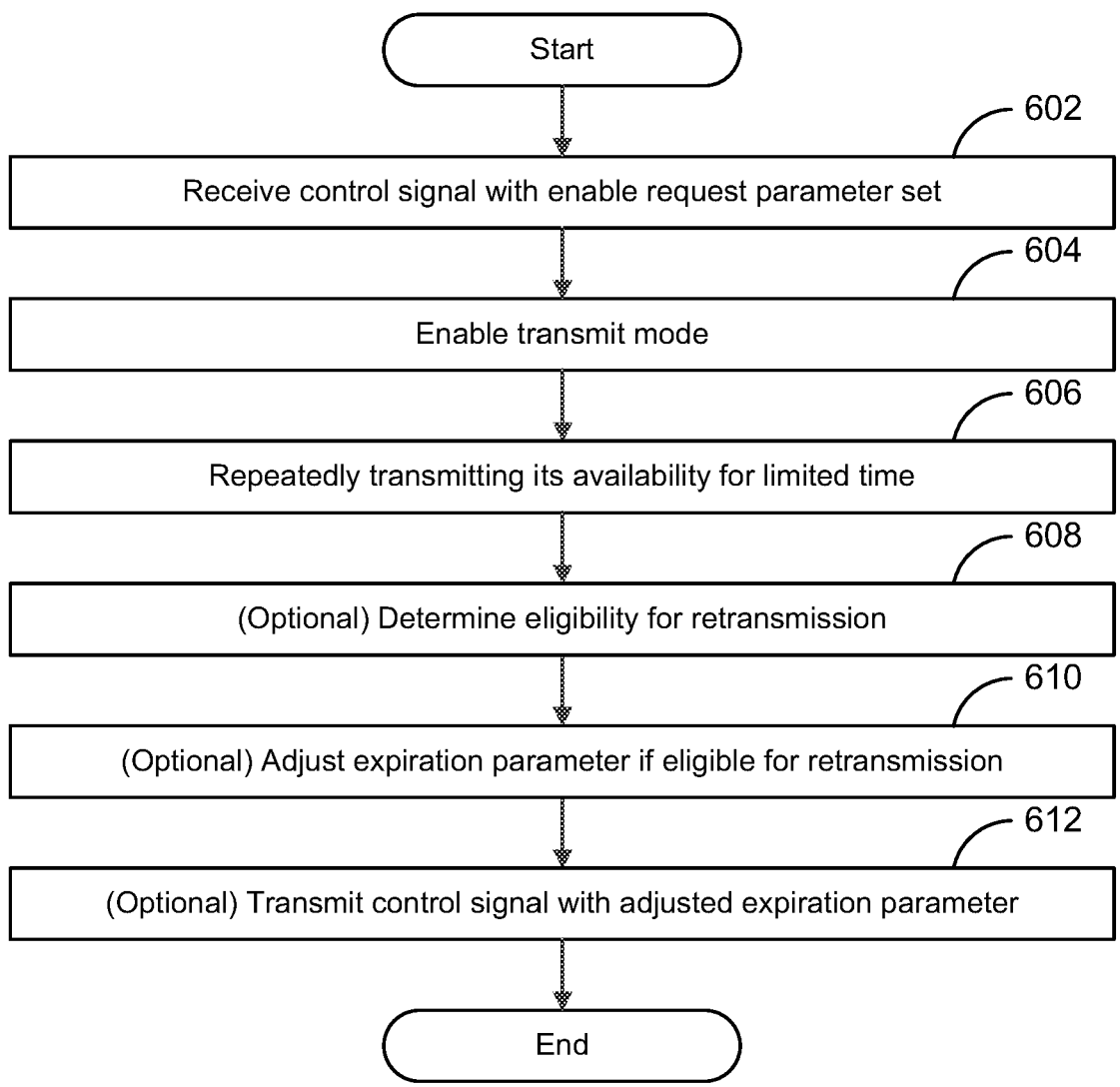
FIG. 6 is a flowchart of an exemplary method for reducing the number of method transmissions in the distributed mesh network of FIGS. 5A-5K, in accordance with some embodiments.

Referring now to FIG. 6, flowchart 600 is depicted disclosing an example of a third method for reducing the number of transmissions performed by the network components of the communication network 500, where each network component may include a processing unit programmed or configured with execution instructions to perform the method of the flowchart 600. For each network component, the instructions may be stored in memory communicating with the processing unit and include an enable/disable mode parameter indicating whether or not the transmit mode of the transceiver is enabled along with a response of enabling or turning on its transmit mode upon receiving an enable request parameter.

When switched to the enable mode, the network component may be enabled to advertise its presence to the other network components for a limited time that may be defined by a user.

The method of flowchart 600 begins with module 602 with one or more network components of the communication network 500 receiving a control signal transmitted, via short-range communications protocol, from a source network component(s) from which the control signal originates. In some embodiments, the control signal could include an enable request parameter along with a TTL parameter.

The method of flowchart 600 continues with module 604 with each network component, in response to receiving the control signal, enabling its transmit mode if not enabled. In some embodiments, the network component could enable its transmit mode for a limited time interval as defined by a user. In some embodiments, an intermediate network component may adjust the TTL parameter to reduce the number of retransmissions remaining if the TTL parameter has not reached its expiration limit.

The method of flowchart 600 continues with module 606 with each intermediate network component repeatedly transmitting its availability to the other network components within the commutations short-range for a limited time as defined by the user.

The method of flowchart 600 continues with module 608 with each network component, in response to receiving the control signal, determining whether the control signal is eligible for retransmission, where such determination could be performed in a similar manner as discussed in module 204 above.

The method of flowchart 600 continues with module 610 with each intermediate network component being eligible (i.e., not the destination network component) receiving the control signal adjusting the TTL parameter, where such adjustment could be performed in a similar manner as discussed in module 206 above.

The method of flowchart 600 continues with module 612 with each intermediate network component, if eligible, transmitting the control signal with the adjusted TTL parameter, where such transmission could be performed in a similar manner as discussed in module 208 above. Then, the method of flowchart 600 ends.

Figure 7:
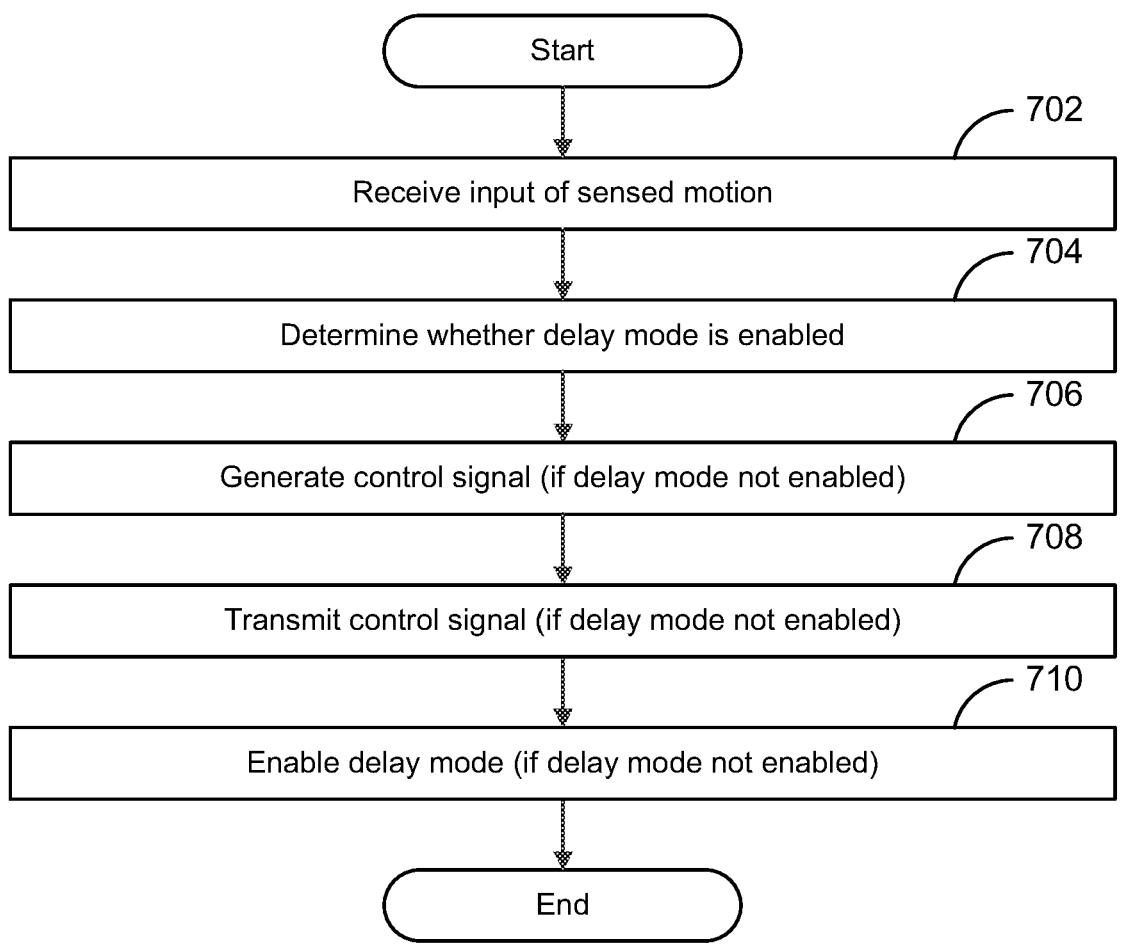
FIG. 7 is a flowchart of an exemplary method for reducing the number of transmissions in a distributed mesh network, in accordance with some embodiments.

Referring now to FIG. 7, flowchart 700 is depicted disclosing an example of a fourth method employing delay modes for reducing the number of transmissions performed by the network components of the communication networks discussed herein, where each network component may include a processing unit programmed or configured with execution instructions to perform the method of the flowchart 700. In some embodiments, the controller could be a source network component configured as a motion sensor. For each network component, the instructions may be stored in memory communicating with the processing unit and include network ID and device ID parameters of the network component. In some embodiments, the instructions could include control of a delay mode parameter of the controller indicating whether or not a delay mode is enabled; when enabled, the subsequent transmission of instructions from the controller to its controlled adaptor(s) is prevented for a time interval that may be defined by a user.

The method of flowchart 700 begins with module 702 with one or more controllers of a communication network receiving input representative of motion being sensed.

The method of flowchart 700 continues with module 704 with each controller, in response to receiving the input, determining whether the delay mode has been enabled.

The method of flowchart 700 continues with module 706 with each controller, in response to determining the delay mode has not been enabled, generating a control signal specifying an operation for the controlled adaptor(s) of each controller to perform.

The method of flowchart 700 continues with module 708 with each controller, in response to determining the delay mode has not been enabled, transmitting the generated control signal.

The method of flowchart 700 continues with module 710 with each controller, in response to determining the delay mode has not been enabled, enabling the delay mode of the source network component. In some embodiments, the enabling of the delay mode could disable, for the defined time interval, the ability of the controller configured as a motion sensor to sense motion. In some embodiments, the enabling of the delay mode could disable the ability of the controller to transmit subsequent signals to its controlled adaptor(s) for the defined time interval. Then, the method of flowchart 700 ends.

Figure 8:
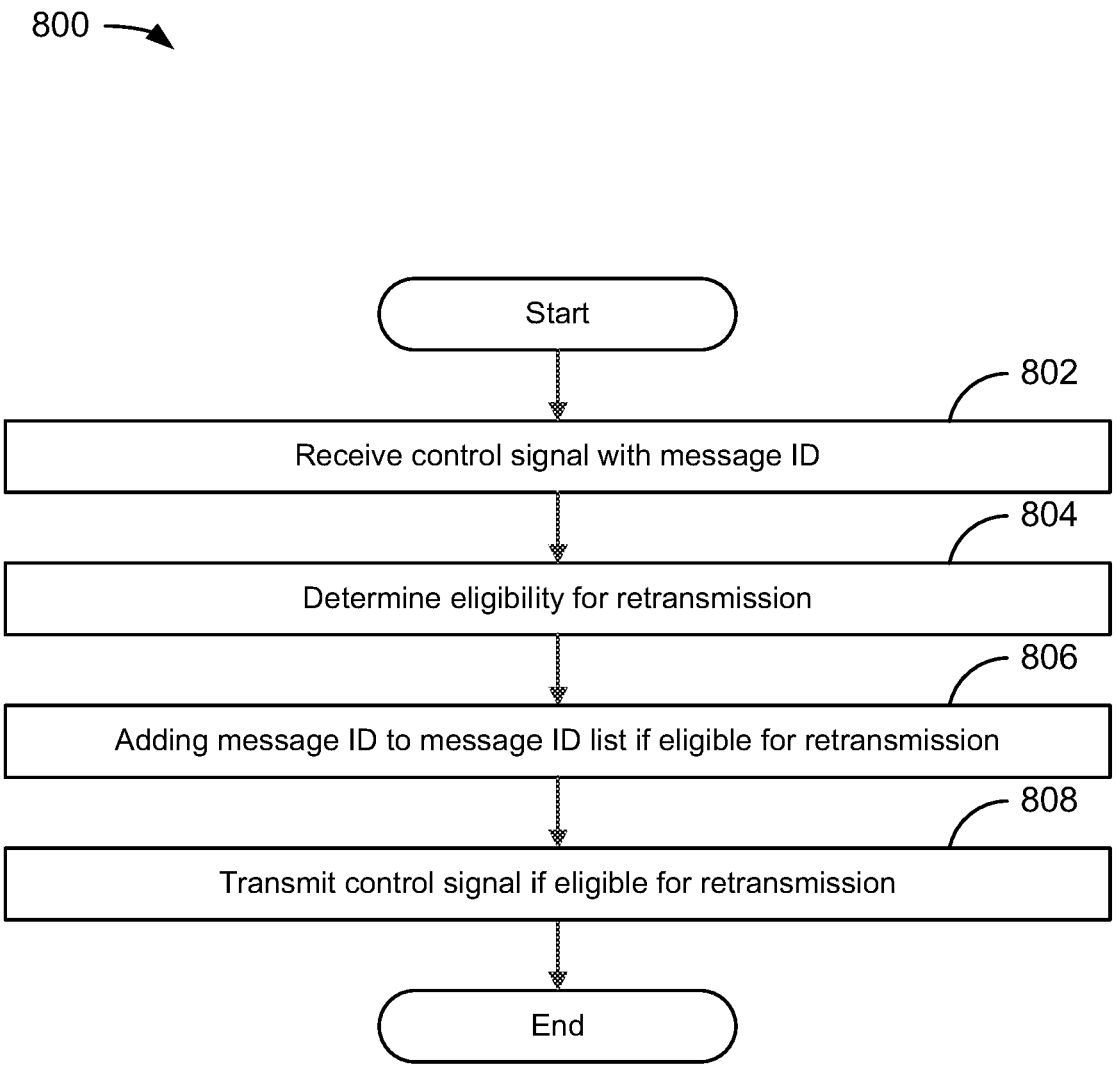
FIG. 8 is a flowchart of an exemplary method for reducing the number of message transmissions in a distributed mesh network, in accordance with some embodiments.

Referring now to FIG. 8, flowchart 800 is depicted disclosing an example of a fifth method employing message IDs for reducing the number of transmissions performed by the network components of the communication networks discussed herein, where each network component may include a processing unit programmed or configured with execution instructions to perform the method of the flowchart 800. For each network component, the instructions may be stored in memory communicating with the processing unit and include network ID and device ID parameters of the network component. In some embodiments, the memory could be configured with instructions to maintain message ID list of messages received by the network component for a user-defined time interval.

The method of flowchart 800 begins with module 802 with one or more network components of a communication network receiving a control signal having a message transmitted from a source network component(s) from which the control signal originates. In some embodiments, the message of the control signal could include a message ID parameter representative of a message ID of the message along with location ID and device ID parameters of a destination network component to which the control signal is destined.

The method of flowchart 800 continues with module 804 with each network component, in response to receiving the control signal, determining whether the control signal is eligible for retransmission from at least the message ID parameter. In some embodiments, the control signal may be determined to be eligible for retransmission if the message ID parameter of the message does not appear on the list of message ID parameters when the control signal is received.

The method of flowchart 800 continues with module 806 with each network component, if the control signal is eligible for retransmission, adding the message ID parameter to a list of message ID parameters maintained.

The method of flowchart 800 continues with module 808 with each network component, if the control signal with the message is eligible for retransmission, transmitting the control signal other network component(s). Then, the method of flowchart 800 ends.

It should be noted that the steps of the method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the broad scope of the inventive concepts disclosed herein. It is intended that all modifications, permutations, enhancements, equivalents, and improvements thereto that are apparent to those skilled in the art upon a reading of the specification and a study of the drawings are included within the broad scope of the inventive concepts disclosed herein. It is therefore intended that the following appended claims include all such modifications, permutations, enhancements, equivalents, and improvements falling within the broad scope of the inventive concepts disclosed herein.

What is claimed is:

1. A network system, comprising:
a plurality of network components including a source network component and a plurality of intermediate network components comprising a group of network components, each network component of the group of network components comprising:
 a transceiver configured to receive and transmit, via a short-range wireless communications protocol, a control signal comprising an network ID and group ID parameters and a request for a response from a group of network components;
 a memory storing a network ID, a group ID, and a responder parameter indicating whether or not the network component is configured as a group responder; and
 a processing unit configured to execute instructions stored in the memory, wherein at least one intermediate network component is configured to:
  receive, via the short-range wireless communications protocol, the control signal originating from the source network component and comprised of network ID and group ID parameters and the request for a response from a group of network components;
  determine whether the network ID and group ID of the intermediate network component matches the network ID and group ID parameters, respectively; and
  transmit, via the short-range wireless communications protocol, the control signal to at least one other network component of the plurality of network components if there is not a match.

2. The network system of claim 1, wherein the at least one intermediate network component is further configured to:
- determine, if there is a match, whether the intermediate network component is a group responder based upon its responder parameter; and
- transmit to the source network component, if the intermediate network component is determined to be a group responder, a response to the request of the control signal.

3. The network system of claim 2, wherein the response to the request of the control signal includes an expiration parameter.

4. The network system of claim 3, wherein the expiration parameter is set to limit the transmitted response to the request of the control signal is limited one transmission.

5. The network system of claim 2, wherein a change to a topology of the network system is determined when a group responder does not transmit a response to the request of the control signal.

6. The network system of claim 5, wherein a network mapping function is initiated when a change to a topology of the network system is determined.

7. The network system of claim 1, wherein the group ID parameter is set upon an initiation of a network mapping function.

8. A method for performing transmissions in a network system, comprising:
- receiving, via a short-range wireless communications protocol and by each one intermediate network component of a plurality of intermediate network components of a network comprised of a plurality of network components, a control signal originating from a source network component of the network and comprised of network ID and group ID parameters and a request for a response from a group of network components in the plurality of intermediate networks;
- determining if its network ID and group ID matches the network ID and group ID parameters, respectively; and
- transmitting, via the short-range wireless communications protocol, the control signal to at least one other network component of the plurality of network components if there is not a match.

9. The method of claim 8, further comprising:
- determining, if there is a match, whether the intermediate network component is a group responder based upon its responder parameter; and
- transmitting to the source network component, if the intermediate network component is determined to be a group responder, a response to the request of the control signal.

10. The method of claim 9, wherein the response to the request of the control signal includes an expiration parameter.

11. The method of claim 10, wherein the expiration parameter is set to limit the transmitted response to the request of the control signal is limited one transmission.

12. The method of claim 9, wherein a change to a topology of the network system is determined when a group responder does not transmit a response to the request of the control signal.

13. The method of claim 12, wherein a network mapping function is initiated when a change to a topology of the network system is determined.

14. The method of claim 8, wherein the group ID parameter is set upon an initiation of a network mapping function.

15. A component of a network, comprising:
- a network component with a processing unit configured to execute instructions stored in the memory and configured to:
- receive, via a short-range wireless communications protocol, a control signal comprised of network ID and group ID parameters and a request for a response from a group of network components;
- determine whether the network ID and group ID of the network component matches the network ID and group ID parameters, respectively; and
- transmit, via the short-range wireless communications protocol, the control signal if there is not a match.

16. The component of claim 15, wherein
the network component is further configured to:
- determine, if there is a match, whether the network component is a group responder based upon its responder parameter; and
- transmit, if the network component is determined to be a group responder, a response to the request of the control signal.

17. The component of claim 16, wherein the response to the request of the control signal includes an expiration parameter.

18. The component of claim 17, wherein the expiration parameter is set to limit the transmitted response to the request of the control signal is limited one transmission.

19. The component of claim 16, wherein a change to a topology of a network system in which the component belongs is determined when the group responder does not transmit a response to the request of the control signal.

20. The component of claim 15, wherein the group ID parameter is set upon an initiation of a network mapping function of a network system in which the component belongs.

* * * * *